United States Patent

Thielemann et al.

[11] Patent Number: 5,736,471
[45] Date of Patent: Apr. 7, 1998

[54] PAPERMAKING MACHINE FABRICS

[75] Inventors: Ralph Thielemann, Kriftel; Peter Klein, Wiesbaden; Rex Delker, Wehringen; Hans Wagner, Bobingen, all of Germany

[73] Assignee: Hoechst Trevira GmbH & Co KG, Germany

[21] Appl. No.: 682,431

[22] Filed: Jul. 17, 1996

[30] Foreign Application Priority Data

Jul. 17, 1995 [DE] Germany ............ 195 25 629.8

[51] Int. Cl.⁶ .................. D02G 3/00; B32B 27/34; D03D 23/00; C08G 63/00
[52] U.S. Cl. .............. 442/220; 428/395; 139/383 R; 528/190; 528/191
[58] Field of Search ................. 428/224, 364, 428/394, 395; 528/191, 190; 442/220; 162/108; 139/383 R

[56] References Cited

U.S. PATENT DOCUMENTS

| | | | |
|---|---|---|---|
| 3,935,166 | 1/1976 | Kanai et al. | 528/190 |
| 4,119,680 | 10/1978 | Vachon | 528/295 |
| 5,607,757 | 3/1997 | Keine . | |

FOREIGN PATENT DOCUMENTS

| | | |
|---|---|---|
| 4307394 | 6/1994 | Germany . |
| WO 9638504 | 12/1996 | WIPO . |

*Primary Examiner*—Newton Edwards
*Attorney, Agent, or Firm*—Connolly & Hutz

[57] ABSTRACT

Papermaking machine fabrics, filters and reinforcing layers for elastomers, comprise monofilaments of copolymers containing 85 to 99 mol % of the structural repeat unit of the formula I

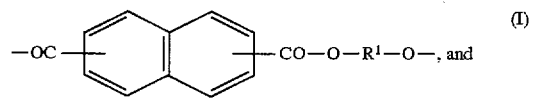

1 to 15 mol % of the structural repeat unit of the formula II $$-OC-R^2-CO-O-R^3-O-\qquad (II),$$

where $R^1$ is a radical of a dihydric aliphatic or cycloaliphatic alcohol or is derived from mixtures of such alcohols, $R^2$ is a radical of an aliphatic, cycloaliphatic or monocyclic aromatic dicarboxylic acid or is derived from mixtures of such dicarboxylic acids, $R^3$ assumes one of the definitions for $R^1$, and the quantitative data are based on the total amount of the polymer.

15 Claims, No Drawings

PAPERMAKING MACHINE FABRICS

DESCRIPTION

Papermaking machine fabrics, filters and reinforcing layers for elastomers comprising monofilaments comprising specific copolyesters, stabilized copolyesters and use of copolyesters for manufacturing papermaking machine fabrics, filters and reinforcing layers for elastomers

BACKGROUND OF THE INVENTION

The present invention relates to the use of selected copolyesters containing naphthalenedicarboxylic acid units for manufacturing papermaking machine fabrics, filters and reinforcing layers for elastomers. The copolyesters used are preferably useful for technical applications, combining high dimensional stability with very good heat, chemical and hydrolysis resistance.

Monofilaments for technical applications are in most cases subjected to high mechanical stresses in use. In many cases there are also thermal stresses and stresses due to chemical and other environmental effects to which the material must offer adequate resistance. Under all these stresses, the material has to have good dimensional stability and constancy of the stress-strain characteristics over prolonged use periods.

An example of technical applications requiring a combination of high mechanical, thermal and chemical resistance is the use of monofilaments in papermaking machine fabrics, especially in the Fourdrinier section, the wet-press section and the dryer section. This use calls for a monofilament material having a high initial modulus and a high breaking strength, good knot and loop strength, high abrasion resistance and a high hydrolysis resistance to withstand the high stresses in the manufacture of paper and ensure adequate fabric life.

At present, papermaking machine fabrics are predominantly manufactured from polyethylene terephthalate monofilaments in the warp and a combination of polyethylene terephthalate and nylon-6 or nylon-6.6 monofilaments in the weft.

These fabrics can have the disadvantage of lengthening in the transport direction in the course of the fabric life in the papermaking machine and therefore a retensioning has to take place.

There has never been a shortage of attempts to produce synthetic monofilament materials suitable for durable papermaking machine fabrics. However, the requirements which these technical products have to meet are so varied that hitherto only partial solutions have been achievable in this field. As an alternative to polyethylene terephthalate, U.S. Pat. No. 5,169,499 describes the use of copolymers based on 1,4-dimethylolcyclohexane, terephthalic acid and isophthalic acid. It is true that these polymers have good hydrolysis resistance, but they exhibit comparatively poor longitudinal, knot and loop strengths.

Alternative materials, such as polyphenylene sulfides, likewise exhibit good hydrolysis resistance, but are very costly to produce and, what is more, have only a low initial modulus.

It is also known to produce polyester fibers having very different mechanical and textile properties. More particularly, it is possible, by variation of the spinning, drawing and relaxation conditions, to use polyethylene terephthalate to produce monofilaments which cover a wide spectrum of the properties relevant for technical monofilaments. However, the efforts to obtain a monofilament material which simultaneously combines the high dimensional stability, abrasion resistance and chemical and hydrolysis resistance required for papermaking machine fabrics have so far not been wholly successful.

In the desire to find a polyester fiber which is suitable for as many technical applications as possible there has been no shortage of attempts either to replace polyethylene terephthalate by other polyester building blocks and by copolyesters.

Alternative polyesters which have already been investigated employ for example polyethylene naphthalate and copolyesters of 4,4'-biphenyldicarboxylic acid and 2,6-naphthalenedicarboxylic acid, as described for example in EP-A-202.631, JP-A-73-96,830 and U.S. Pat. No. 5,405,685. Fibers formed from 4,4'-biphenyldicarboxylic acid and 2,6-naphthalenedicarboxylic acid are proposed in WO-A-93/02122. These fibers derived from polyesters based on 2,6-naphthalenedicarboxylic acid customarily have a high longitudinal strength and a high modulus when spun with a high drawdown without any further afterdrawing. However, the usefulness of the prior art materials for the production of monofilaments, in particular for manufacturing papermaking machine fabrics, has to be doubted, since it is known from experience that a high modulus is generally accompanied by a low knot and loop strength.

It is also known that polymers of 4,4'-biphenyldicarboxylic acid crystallize extremely rapidly. For this reason the manufacturability of monofilaments using this raw material has to be doubted, since an overly rapid crystallization leads to early embrittlement of the monofilaments even during the actual manufacturing process, so that they break before sufficient orientation has been achieved.

JP-A-41-914 discloses monofilaments of poly(ethylene 2,6-naphthalate) which are suitable for manufacturing screen printing fabrics. These polymers may include up to 15 mol % of terephthalic acid or isophthalic acid units by way of modification.

It has now been found that monofilaments of selected copolyesters can be processed into monofilaments which combine a high modulus and improved knot and loop strength with particularly good chemical and hydrolysis resistance, especially in hot moist environments. These copolymers make it possible to produce high modulus monofilaments having very high mechanical strength.

DETAILED DESCRIPTION OF THE INVENTION

The present invention accordingly provides papermaking machine fabrics, filters and layers for reinforcing elastomers comprising monofilaments comprising copolymers containing 85 to 99 mol % of the structural repeat unit of the formula I

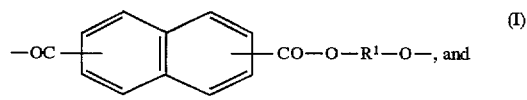

1 to 15 mol % of the structural repeat unit of the formula II

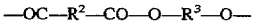

where $R^1$ is a radical of a dihydric aliphatic or cycloaliphatic alcohol or is derived from mixtures of such alcohols, $R^2$ is a radical of an aliphatic, cycloaliphatic or monocyclic aromatic dicarboxylic acid or is derived from mixtures of such dicarboxylic acids, $R^3$ assumes one of the definitions for $R^1$, and the quantitative data are based on the total amount of the polymer.

Preference is given to copolymers containing 90 to 96 mol % of the structural repeat unit of the formula I and 4 to 10 mol % of the structural repeat unit of the formula II.

The dicarboxylic acid component in the structural repeat unit of the formula I can be a radical derived from any naphthalenedicarboxylic acid. Examples of radicals derived from any naphthalenedicarboxylic acid are 1,8-, 1,4-, 1,5-, 2,7- and especially the 2,6-derivatives of naphthalenedicarboxylic acid.

These radicals can be substituted by one or two inert radicals. Examples thereof are alkyl or alkoxy groups or halogen atoms. This is true especially of alkyl groups having 1 to 6 carbon atoms, which can be branched or preferably straight-chain, most preferably methyl or ethyl; or alkoxy groups having 1 to 6 carbon atoms in the alkyl radical, which can be branched or preferably straight-chain, most preferably methoxy or ethoxy; or chlorine or bromine.

When any radicals are groups derived from a dihydric aliphatic or cycloaliphatic alcohol, the alcohol in question is any dihydric primary, secondary or tertiary alcohol.

Preferred aliphatic alcohols have 2 to 4 carbon atoms. Particularly preferred examples thereof are 1,3-propanediol, 1,4-butanediol or especially 1,2-ethylene glycol. Further examples of alcohols for use in the present invention are polyalkylene glycols, such as di-, tri- or tetraethylene glycol, di-, tri- or tetrapropylene glycol or di-, tri- or tetrabutylene glycol. These polyalkylene glycols are used especially in small amounts in mixtures together with the corresponding alkylene glycols.

Preferred cycloaliphatic alcohols have 6 ring carbon atoms. A preferred example thereof is 1,4-cyclohexanedimethanol.

These radicals of aliphatic or cycloaliphatic alcohols can be substituted by one or two inert radicals. Examples thereof are alkyl or alkoxy groups or halogen atoms. This is true especially of alkyl groups having 1 to 6 carbon atoms, which can be branched or preferably straight-chain, most preferably methyl or ethyl; or alkoxy groups having 1 to 6 carbon atoms in the alkyl radical, which can be branched or preferably straight-chain, most preferably methoxy or ethoxy; or chlorine or bromine.

A radical of an aliphatic dicarboxylic acid can be a straight-chain or branched alkylene radical or a saturated or ethylenically unsaturated alkylene radical; such a radical preferably has one to ten carbon atoms. Examples thereof are radicals derived from adipic acid, sebacic acid, succinic acid or fumaric acid.

A radical of a cycloaliphatic dicarboxylic acid is customarily a group having a ring with five or in particular six carbon atoms; an example is 1,4-cyclohexylene.

A radical of a monocyclic aromatic dicarboxylic acid is customarily a group having an aromatic ring with six carbon atoms; examples are 1,3- or 1,4-phenylene.

These radicals of aliphatic, cycloaliphatic or aromatic dicarboxylic acids can be substituted by one or two inert radicals. Examples thereof are alkyl or alkoxy groups or halogen atoms. This is true especially of alkyl groups having 1 to 6 carbon atoms, which can be branched or preferably straight-chain, most preferably methyl or ethyl; or alkoxy groups having 1 to 6 carbon atoms in the alkyl radical, which can be branched or preferably straight-chain, most preferably methoxy or ethoxy; or chlorine or bromine.

The copolyesters used in this invention customarily have an intrinsic viscosity of at least 0.5 dl/g, preferably 0.6 to 1.5 dl/g. The intrinsic viscosity is measured in a solution of the copolyester in dichloroacetic acid at 25° C.

There are a number of applications where it is of advantage for the copolymers to be used in this invention to be additionally stabilized against thermal and/or chemical degradation. Ways of doing this are to add a polyester stabilizer and/or to cap the end groups of the copolyester with capping agents.

In a particularly preferred embodiment, the copolyester to be used in this invention has carboxyl end groups capped by reaction with a carbodiimide.

In a further particularly preferred embodiment, the copolyester to be used according to this invention has carboxyl end groups capped by reaction with carbodiimide by effecting the capping of the carboxyl end groups predominantly by reaction with mono- and/or polycarbodiimides, especially by reaction with a mixture of mono- and polycarbodiimides.

The amounts used are preferably 0.4 to 1% by weight of monocarbodiimide, preferably 0.45 to 0.6% by weight, and 0.15 to 2.25% by weight of polycarbodiimide, preferably 0.75 to 1.8% by weight, based on the amount of the copolyester.

Polyesters thus end group stabilized are known from DE-A-4,307,392, EP-A-503,421 and EP-A-417,717.

The selected end group stabilized copolyesters defined above likewise form part of the subject matter of the present invention.

The monofilaments used in this invention customarily have diameters from 0.1 to 2 mm, preferably 0.15 to 1 mm.

In what follows, the production of the monofilaments used in this invention is described.

The spinning temperature and the drawdown, which can be determined by setting the extrusion rate and the spinning takeoff speed, and also the drawing conditions are preferably chosen so that the monofilaments obtained for use in this invention have the following properties:

an initial modulus at 25° C. of greater than 12 N/tex, preferably greater than 16 N/tex;

a tenacity of 30 to 70 cN/tex, preferably of 40 to 60 cN/tex;

a tenacity elongation of 2 to 20%, preferably of 5 to 10%;

a loop strength of 15 to 40 cN/tex, preferably 20 to 35 cN/tex;

a knot strength of 25 to 50 cN/tex, preferably 30 to 45 cN/tex;

and a 180° C. dry heat shrinkage of 1 to 20%, preferably 5 to 10%.

The exact determination of the composition and spinning parameters to obtain a certain combination of monofilament properties can be routinely carried out by determining the dependence of the contemplated monofilament property on the composition of the polyester and on the spinning parameters mentioned.

The monofilaments used in this invention, as well as the copolyesters described above, may include additives, for example catalyst residues, processing aids, stabilizers, antioxidants, plasticizers or lubricants.

These additives are customarily present in a concentration of up to 10% by weight, preferably 0.01 to 5% by weight, in particular 0.1 to 2% by weight.

The catalyst residues can be for example antimony trioxide or tetraalkoxytitanates.

The processing aids or lubricants used can be siloxanes, especially polymeric dialkyl- or diaryl-siloxanes and waxes and also organic carboxylic acids having more than 6 carbon atoms, aliphatic, aromatic and/or perfluorinated esters and ethers.

The monofilaments may also include inorganic or organic pigments or delustrants, for example organic dye pigments or titanium dioxide, or carbon black as coloring or conductivity additive.

The stabilizers used are for example phosphorus compounds, such as, for example, phosphoric esters.

In a further preferred embodiment, the monofilaments used in this invention may also include other polymers, such as, for example, fluorine-containing extrudable polymers. The addition of fluorine-containing polymers in the production of monofilaments is known for example from DE-A-4, 307,394.

The copolyesters used in this invention are prepared by polycondensation of the corresponding dicarboxylic acid and diol components, advantageously by first polycondensing in the melt to an intermediate intrinsic viscosity value and then further condensing in the solid state to the desired final viscosity. After the solid state polycondensation, the high molecular weight copolyester is melt spun in a conventional manner to form the monofilaments used in this invention.

The copolyester is customarily dried immediately before spinning, preferably by heating in a dry atmosphere or under reduced pressure.

The copolyester is then melted in an extruder, filtered in a customary spin pack and spun through a spinneret. The spun molten filament can be cooled down in a spin bath (for example water at about 70° C.) and be wound up or taken off at a speed which is greater than the rate of extrusion of the copolyester melt.

It has proved particularly advantageous for the production of the monofilaments used in this invention to operate at a melt temperature within the range from 270° to 310° C., preferably 280° to 300° C., and with a drawdown of 1:1.5 to 1:5.0, preferably 1:2 to 1:3.

At higher drawdowns the monofilaments obtained have increasingly poorer drawing properties and the mechanical properties, especially the knot strength and the loop strength, deteriorate dramatically.

The spun monofilaments are advantageously cooled down by quenching in a spin bath.

The spinning takeoff speed is 5 to 30 m/min, preferably 10 to 20 m/min, in the interests of an economical production of the monofilaments of this invention.

The spun filament thus produced can then be subjected to an afterdrawing, preferably in a plurality of stages, especially a two- or three-stage afterdrawing, to a total draw ratio of 1:4 to 1:8, preferably 1:5 to 1:7, and then heat set at temperatures of 190° to 250° C., preferably of 200° to 220° C., with constant length or with 2 to 10%, preferably 3 to 6%, shrinkage being allowed.

The present invention also provides for the use of the fibers of this invention for manufacturing papermaking machine fabrics, filters or layers for reinforcing elastomers.

The monofilaments can be woven up to the papermaking machine fabrics on conventional full width weaving machines using the machine parameters customary in the weaving of polyethylene terephthalate.

For instance, good woven fabric is obtained by weaving monofils having a diameter of 0.17 mm in the warp with face wefts of 0.2 mm and back wefts of 0.22 mm. The fabric possesses very good dimensional stability and abrasion resistance, which can be still further improved by using polyamide monofilaments in the back weft.

The fabric obtained is generally aftertreated on an appropriately dimensioned heat setter in order that the specific papermaking machine fabric properties desired in an individual case may be conferred.

The papermaking machine fabric produced in this way from monofilaments to be used in this invention has better dimensional stability warpways and weftways compared with material produced from conventional polyethylene terephthalate monofilaments and is smoother and faster running in the papermaking machine as a result, which is of benefit to the quality and yield of the paper produced.

Fabrics manufactured from instant monofilaments can also be used with advantage as mechanically and chemically supremely stable filter material or as high strength and dimensionally stable reinforcing layer for conveyor belts.

The examples which follow illustrate the invention without limiting it.

EXAMPLE 1

A copolyester obtained by reacting 92 mol % of dimethyl 2,6-naphthalenedicarboxylate and 8 mol % of dimethyl terephthalate and ethylene glycol is spun at a melt temperature of 300° C. The monofilaments thus obtained are quenched in a spin bath at 70° C. and drawn to a draw ratio of 1:6.0. The monofilaments obtained have the following properties:

Diameter: 0.17 mm

Breaking strength: 55 cN/tex

Breaking extension: 10.5%

Modulus: 18 N/tex

Knot strength: 25 cN/tex

Loop strength: 29 cN/tex

By comparison, monofilaments produced by the same process from poly(ethylene 2,6-naphthalate) have loop strengths of only 5 cN/tex.

EXAMPLE 2

A monofilament produced by the method of Example 1 with a diameter of 0.5 mm has a residual breaking strength of 52% following an 80 hour saturated steam treatment at 135° C.

The addition of carbodiimides raises the residual breaking strength to more than 90%.

By contrast, a carbodiimide-stabilized polyethylene terephthalate monofilament has a residual breaking strength of 35%.

What is claimed is:

1. A papermaking machine fabric comprising woven monofilaments made from a copolymer having 85 to 99 mol % of the structural repeat unit of the formula I

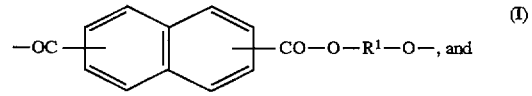

1 to 15 mol % of the structural repeat unit of the formula II

where $R^1$ is a radical of a dihydric aliphatic or cycloaliphatic alcohol or is derived from a mixture of such alcohols, $R^2$ is a radical of an aliphatic, cycloaliphatic or monocyclic aromatic dicarboxylic acid or is derived from a mixture of such dicarboxylic acids, $R^3$ assumes one of the definitions for $R^1$, and the quantitative data are based on the total amount of the polymer.

2. The papermaking machine fabric of claim 1, wherein the copolymer contains 90 to 96 mol % of the structural repeat unit of the formula I and 4 to 10 mol % of the structural repeat unit of the formula II.

3. The papermaking machine fabric of claim 1, wherein the dicarboxylic acid ester moiety in the structural repeat unit of the formula I is derived from 2,6-naphthalenedicarboxylic acid.

4. The papermaking machine fabric of claim 1, wherein $R^1$ and $R^3$ are derived from 1,3-propanediol, 1,4-butanediol or 1,2-ethylene glycol.

5. The papermaking machine fabric of claim 1, wherein $R^1$ and $R^3$ are derived from 1,4-cyclohexanedimethanol.

6. The papermaking machine fabric of claim 1, wherein $R^2$ is derived from terephthalic acid and isophthalic acid.

7. The papermaking machine fabric of claim 1, wherein the monofilaments include at least one further extrudable polymer.

8. The papermaking machine fabric of claim 1, wherein $R^1$ or $R^3$ is derived from 1,3 propanediol, 1,4-butanediol or 1,2-ethylene glycol.

9. The papermaking machine fabric of claim 1, wherein $R^1$ or $R^3$ is derived from 1,4-cyclohexanedimethanol.

10. The papermaking machine fabric of claim 1, wherein $R^2$ is derived from terephthalic acid or isophthalic acid.

11. The papermaking machine fabric of claim 1, wherein the monofilaments have diameters from 0.1 to 2.0 mm.

12. The papermaking machine fabric of claim 1, wherein the monofilaments have a tenacity elongation of 2 to 20%.

13. The papermaking machine fabric of claim 1, wherein the monofilaments have an initial modulus at 25° C. of greater than 12 cN/tex.

14. The papermaking machine fabric of claim 1, wherein the monofilaments have a loop strength of 15 to 40 cN/tex.

15. The papermaking machine fabric of claim 1, wherein the monofilaments have a 180° C. dry heat shrinkage of 1 to 20%.

* * * * *